US008249164B2

(12) United States Patent
Sadowski

(10) Patent No.: US 8,249,164 B2
(45) Date of Patent: Aug. 21, 2012

(54) SUB-FRAME VIDEO DECODING

(75) Inventor: Greg Sadowski, Cambridge, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1432 days.

(21) Appl. No.: 11/627,757

(22) Filed: Jan. 26, 2007

(65) Prior Publication Data

US 2008/0180574 A1 Jul. 31, 2008

(51) Int. Cl.
*H04N 11/00* (2006.01)
*H04N 7/26* (2006.01)
*H04N 5/445* (2011.01)
*G06F 3/14* (2006.01)

(52) U.S. Cl. ......... 375/240.25; 375/240.01; 375/240.24; 715/722; 348/561

(58) Field of Classification Search ............ 375/240.24–240.26; 348/561
See application file for complete search history.

(56) References Cited

U.S. PATENT DOCUMENTS

| 5,386,241 | A | * | 1/1995 | Park | 348/565 |
| 5,828,421 | A | * | 10/1998 | Boyce et al. | 348/565 |
| 5,847,771 | A | * | 12/1998 | Cloutier et al. | 348/564 |
| 6,553,150 | B1 | * | 4/2003 | Wee et al. | 382/243 |
| 2003/0184271 | A1 | * | 10/2003 | Aisaka et al. | 323/283 |
| 2004/0136596 | A1 | * | 7/2004 | Oneda et al. | 382/232 |

OTHER PUBLICATIONS

International Organization for Standardization et al., "Information Technology—Generic Coding of Moving Pictures and Associated Audio Information—Part 7: Advanced Audio Coding (AAC)", ISO/IEC 13818-7, Fourth Edition, (Jan. 15, 2006).
International Telecommunication Union, "Series H: Audiovisual and Multimedia Systems, Infrastructure of Audiovisual Services—Coding of Moving Video", Advanced Video Coding for Generic Audiovisual Services, Amendment 1: Support of Additional Colour Spaces and Removal of the High 4:4:4 Profile, ITU-T Recommendation H.264 Amendment 1, (Jun. 2006).
International Telecommunication Union, "Series H: Audiovisual and Multimedia Systems, Infrastructure of Audiovisual Services—Coding of Moving Video", Advanced Video Coding for Generic Audiovisual Services, ITU-T Recommendation H.264, (Mar. 2005).
The Society of Motion Picture and Television Engineers, "VC-1 Compressed Video Bitstream Format and Decoding Process", SMPTE 421M-2006, (Feb. 24, 2006).

* cited by examiner

*Primary Examiner* — Joseph Ustaris
*Assistant Examiner* — On S Mung
(74) *Attorney, Agent, or Firm* — Volpe and Koenig, P.C.

(57) ABSTRACT

A video processing apparatus, for use in a video receiver, includes a decoder configured to decode encoded video information into decoded video information and to output the decoded information, and a configuration module coupled to the decoder and configured to a provide a control signal to the decoder indicative of a reduced-image portion of the video frames to be displayed, where the decoder is configured to respond to the control signal by decoding first macroblocks of the video information within the reduced-image portion and second macroblocks of the video information, in a reference section, adjacent the first macroblocks to account for motion of the images in the reduced-image portion without decoding third macroblocks lying outside of the reduced-image portion and the reference section.

24 Claims, 6 Drawing Sheets

SUB-FRAME VIDEO DECODING

BACKGROUND

Today, people view many different types of video for various purposes, such as entertainment, obtaining information, educational purposes, etc. People receive the video information from various sources such as cable television providers, satellite television providers, broadcast television providers, and local video sources (e.g., DVD players, VHS players, video games, etc.). The video information may be in various formats such as high definition television and may be compressed using various standards such as H.264, etc.

The various types of video and the various compression formats for the video result in significant amounts of computing power, and therefore electrical power, in order to decode and display the video. The amounts of power to decode various video streams may not be an issue if the video display device is connected to a wall outlet or other effectively endless supply of power. If, however, the power source is limited, e.g., a laptop computer battery or other battery, then the amount of video that can be decoded and displayed can be limited significantly in time.

Further, how video is displayed for a user is typically outside of the user's control. While the user may adjust characteristics of the video such as color, tint, contrast, brightness, etc., the user cannot adjust what is displayed.

Referring to FIG. 1, a video system 500 includes a satellite TV provider 502, a video interface device 504, a transmitter 506, a receiver 508, a cable TV provider 510, and a local video source 512. The satellite TV provider 502 can transmit video signals through the transmitter 506 that are received by the receiver 508 and transmitted to the video interface device 504. The cable TV provider 510 and the local video source 512 can also provide video signals to the video interface device 504. The device 504 can process the received video signals, including decoding these signals, and display corresponding video images to a user.

SUMMARY

In general, in an aspect, the invention provides a video processing apparatus for use in a video receiver, the video processing apparatus including a decoder configured to decode encoded video information into decoded video information and to output the decoded information, and a configuration module coupled to the decoder and configured to a provide a control signal to the decoder indicative of a reduced-image portion of the video frames to be displayed, where the decoder is configured to respond to the control signal by decoding first macroblocks of the video information within the reduced-image portion and second macroblocks of the video information, in a reference section, adjacent the first macroblocks to account for motion of the images in the reduced-image portion without decoding third macroblocks lying outside of the reduced-image portion and the reference section.

Implementations of the invention may provide one or more of the following features. The configuration module is configured to indicate a size of the reduced-image portion. The configuration module is configured to indicate a location of the reduced-image portion. The decoder is configured to alter a location of the reduced-image portion dynamically. The decoder is configured to alter the location of the reduced-image portion to encompass an area of the image experiencing change from frame to frame. The apparatus further includes a power controller configured to determine power availability for the decoder and configured to set a clock frequency used by the decoder and a supply voltage used by the decoder, where the configuration module is coupled to the power controller and configured to determine a first remaining time available for decoding the video information in a first, present manner given the power availability. The configuration module is further configured to determine a second remaining time available for decoding the video information in a second manner, different than the first manner, given the power availability. The reduced-image portion is a first reduced-image portion with a first area and the second manner includes decoding using a second reduced-image portion with a second area different than the first area.

In general, in another aspect, the invention provides a video processing and display system including a display configured to provide visual images corresponding to video signals processed by the system, and a video processing module coupled to the display and configured to receive and process video signals containing encoded video information indicative of frames of video images, the encoded video information corresponding to groups of image pixels, the video processing module being configured to selectively decode only a portion of the encoded information for a particular video frame, the portion being less than all of the encoded information for all the pixels of the particular video frame, the portion corresponding to a subset of the groups of pixels for the particular frame, the subset containing less than all of the groups of pixels, the video processing module further configured to provide decoded signals to the display to display a reduced-size image for the particular frame, the reduced-size image being smaller than the frame and corresponding to the decoded portion of the encoded information for the particular frame.

Implementations of the invention may provide one or more of the following features. The reduced-size image has a rectangular shape. The subset is a first subset of groups of pixels and the reduced-size image consists of a second subset of groups of pixels consisting of less than all the groups of pixels in the first subset. The video processing module is configured to decode only the portion of the encoded information in response to at least one of: a selection of a fast-forwarding feature, a selection of a picture-in-picture feature, a selection of a power-save feature, and a timeout of a preview feature. The video processing module is configured to automatically and dynamically change which groups of pixels to decode as the portion of the encoded information independent of input from a source external to the system. The video processing module is configured to determine indications of time remaining for processing the encoded video information at a first, current power consumption pace and at a second, alternate power consumption pace, the first and second power consumption paces corresponding to different image display sizes, at least one of the first and second power consumption paces corresponding to the video processing module decoding only the portion of the encoded video information.

In general, in another aspect, the invention provides a video processing apparatus for use in a video receiver, the video processing apparatus including an input configured to receive encoded video signals indicative of pixel values for pixels in video frames, and a video processing module configured to decode the encoded video signals to provide decoded video signals indicative of the pixel values for full video frames in a first mode at a first rate and in a first resolution, and to operate in a second mode to decode only some of the pixel values for each video frame to provide decoded video signals indicative of the pixel values for partial video frames.

Implementations of the invention may provide one or more of the following features. The frames have a frame size, and wherein the video processing module is configured, in the second mode, to: decode only pixel values in a reference portion of each frame, the reference portion consisting of contiguous pixels and having a decode-window size that is smaller than the frame size; and output decoded video information for use by a display to display a display-window image having a display-window size that is smaller than the decode-window size. The output decoded video information is configured to cause the display-window image to be in the first resolution. The output decoded video information is configured to cause the display-window image to be a picture-in-picture image free of scaling. The video processing module is configured to output the decoded video information in the second mode at a second rate, the second rate being faster than the first rate. The video processing module is configured to enter the second mode in response to at least one of: an initiation of fast-forwarding of the video frames, an initiation of picture-in-picture mode, an initiation of a power-save mode, and a timeout of a video-preview mode. The video processing module is configured to alter a location of the reference portion based on changes in pixel values in a series of the frames. The video processing module is configured to estimate a first time remaining for operation in the first mode and to estimate a second time remaining for operation in the second mode and to output indications of the first and second times remaining and an indication of the display-window size in association with the second time remaining. The video processing module is configured to receive user input to zoom in on a zoom portion of the frame that is smaller than the display-window size and to scale the zoom portion to the display-window size.

In general, in another aspect, the invention provides a user-interface method including presenting video display options to a user, receiving user selection of a desired video display option from the presented options, and setting video decoding parameters, in accordance with the user selection, indicative of a reduced-image portion of video frames to be displayed.

Implementations of the invention may provide one or more of the following features. The method further includes decoding, in accordance with the video decoding parameters, first macroblocks of video information within the reduced-image portion and second macroblocks of the video information, in a reference section of the video frames, adjacent the first macroblocks without decoding third macroblocks lying outside of the reduced-image portion and the reference section.

In accordance with implementations of the invention, one or more of the following capabilities may be provided. High-definition video fast forwarding can be provided. Video decoding can be provided at reduced power levels compared to prior techniques. High-definition video can be provided for picture-in-picture window. Portions of a video frame can be selected for display. Video preview windows can be provided to display portions of a video. A power saving mode can be provided for high-definition video display.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for selecting and displaying portions of video frames. For example, a video receiver can include a power controller, a decoder, and a configuration block. The configuration block can communicate with the power controller to determine power available for decoding and displaying video. The configuration block can interact with a user to determine selected or desired video display formats and can provide options for available video display formats. The configuration block can select and communicate with the decoder to indicate a selected portion, e.g., a panning window, of a video frame to be decoded and displayed to the user. The selected panning window can be moved, e.g., automatically (e.g., to follow motion of objects, changes of color, etc.) by the configuration block or manually in response to user input. The panning window shape and size can be altered. For example, physically separate portions of the video frame can be decoded and displayed. This system is exemplary, however, and not limiting of the invention as other implementations in accordance with the disclosure are possible.

Figure 1:
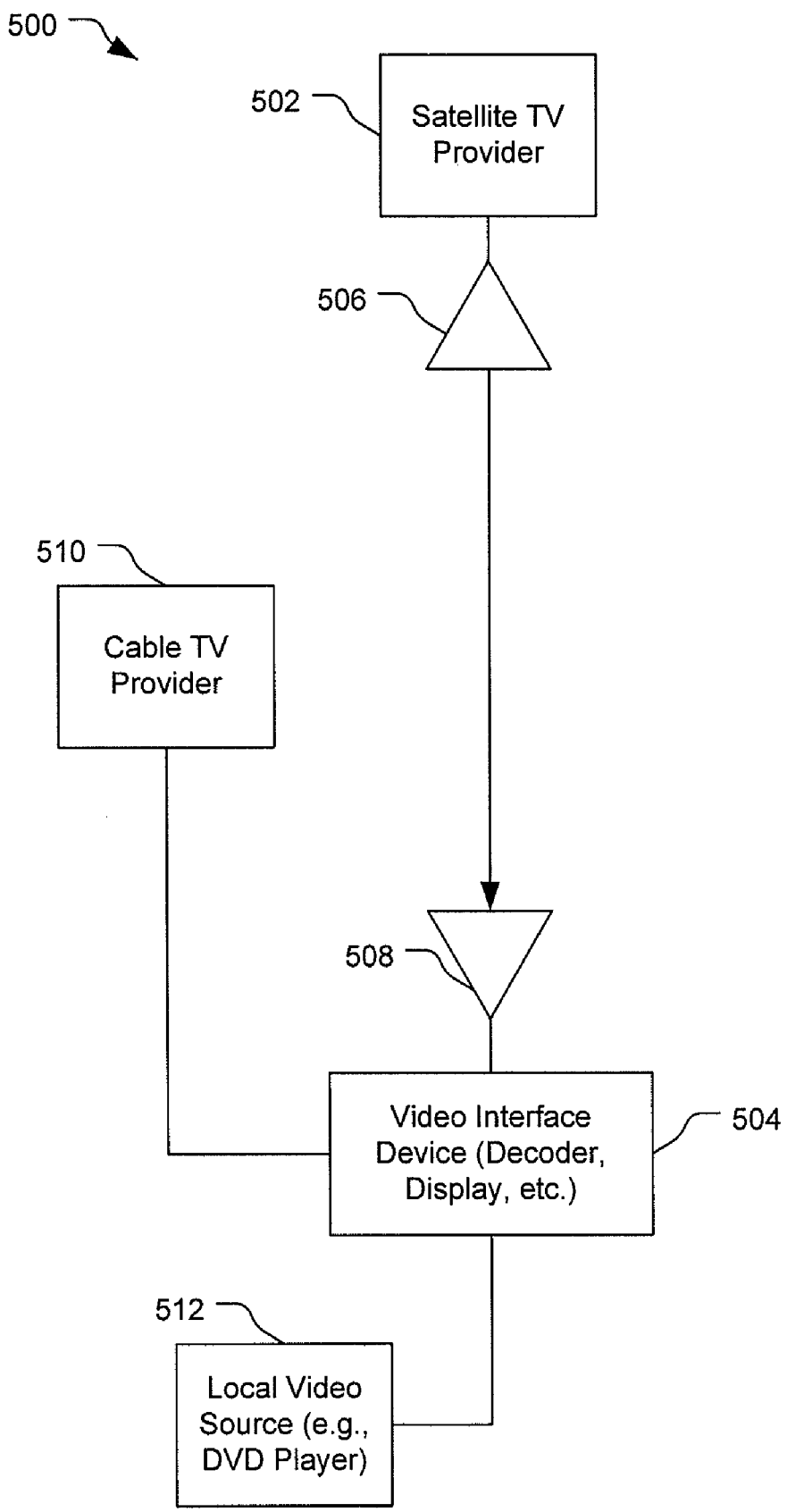
FIG. 1 is a block diagram of a video transmit and receive system.
Figure 2:
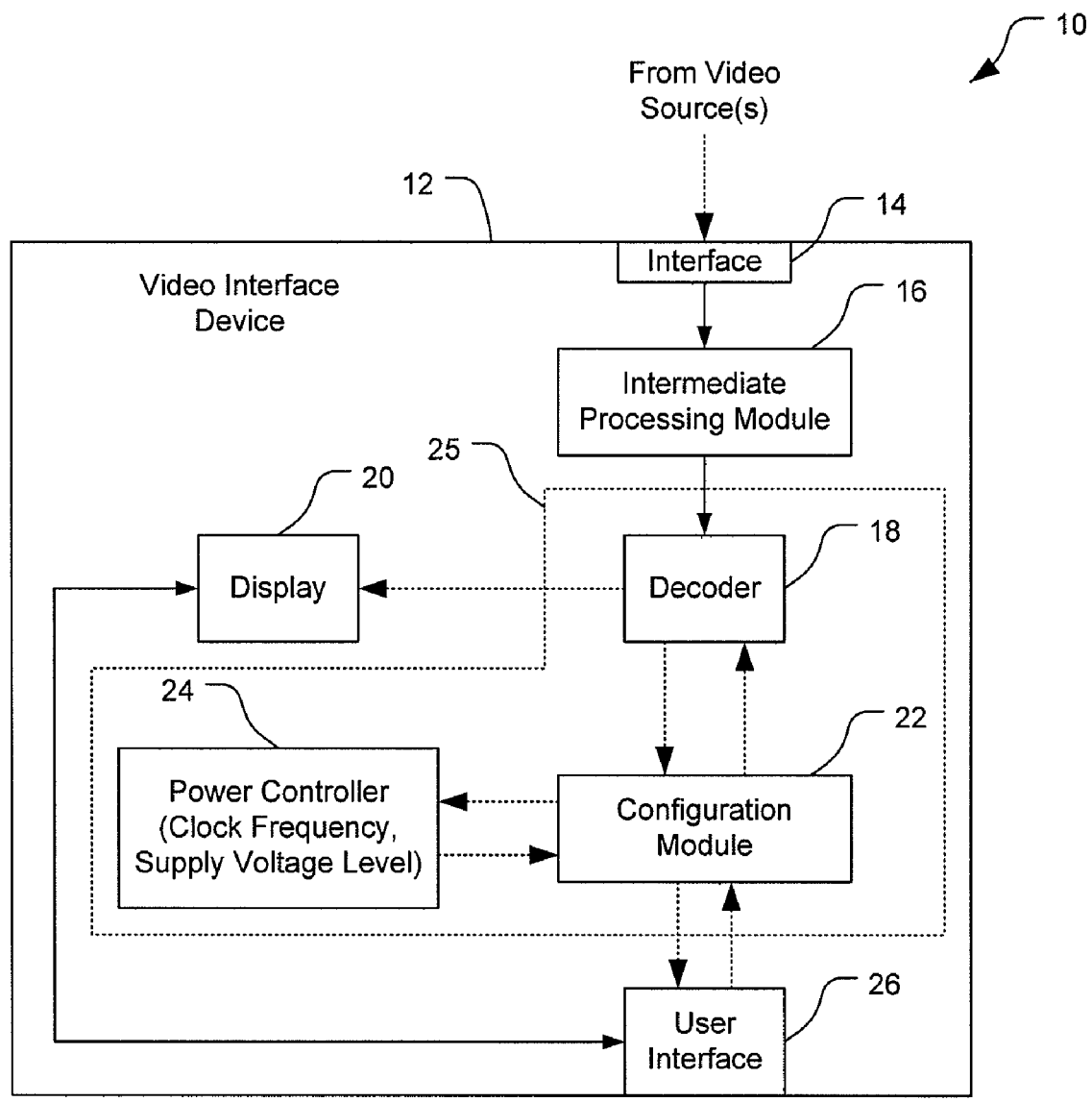
FIG. 2 is a block diagram of a video receiver.

Referring to FIG. 2, a video system 10 includes a video interface device 12, which includes an interface 14, an intermediate processing module 16, a decoder 18, a display 20, a configuration module 22, a power controller 24, and a user interface 26. Preferably, the decoder 18, the configuration module 22, and the power controller 24 are all portions of a single video processor chip 25, although this is not required. The interface 14 is configured to receive video signals from various video sources (e.g., remote or local video sources) and provide the video signals to the intermediate processing module 16. The intermediate processing module 16 is configured to perform appropriate initial processing and to provide the processed signals to the decoder 18. The decoder 18 is configured to decompress and decode the video signals (e.g., by performing MPEG decoding, or other decoding of other compression formats) in accordance with instructions from the configuration module 22 and to provide the decoded signals to the display 20 for display to a user. The configuration module 22 and the power controller 24 include a common processor (although multiple processors could be used) such as a central processing unit (CPU) and memory with stored computer software code instructions to be read and executed by the processor to perform functions described herein. The module 22 is configured to provide intelligence to the interface device 12, in particular for the power controller 24, and to interact with the user through the user interface 26. The power controller 24 is configured to take actions regarding a clock frequency and a supply voltage level of the interface device 12. The user interface 26 is configured to provide information to the user and receive information from the user regarding selections of options for video display. For example, the user interface 26 can provide information on the display 20 and receive user input through various techniques such as a mouse, a keyboard, or touch if the display 20 is a touch-sensitive display.

The decoder 18 is configured to decode incoming video signals and provide the decoded signals to the display 20 for display to the user. The decoder 18 can undo the encoding performed by the source of the video signals, decompress the video signals, and otherwise prepare the signals for use by the display 20. The decoder 18 can decode information for an entire frame of pixels for a full-frame image, or decode only a portion of the pixels of each frame to provide partial-frame images.

Figure 3:
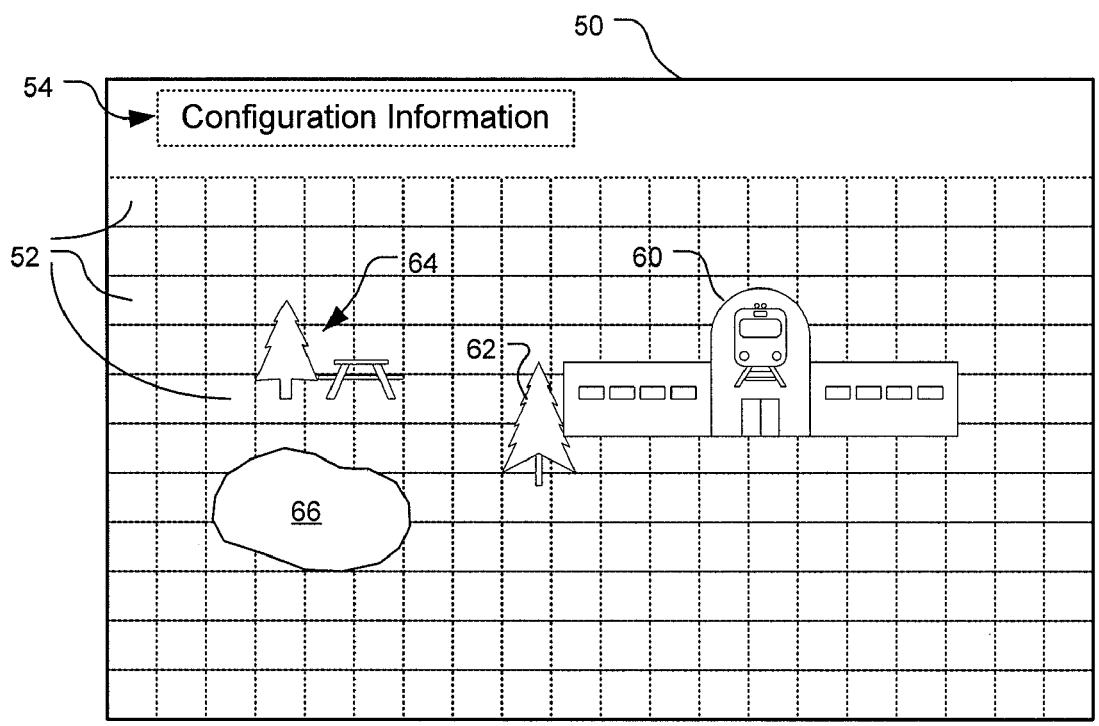
FIG. 3 is a schematic diagram of a video frame indicating macroblocks of the frame.
Figure 4:
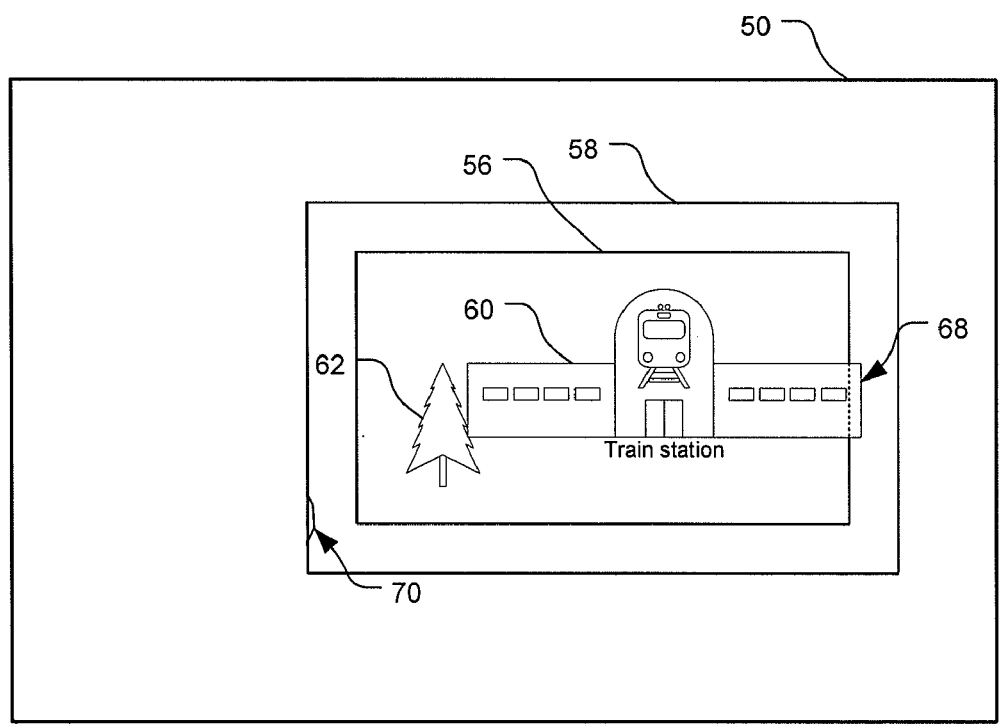
FIG. 4 is a schematic diagram of the frame shown in FIG. 3 indicating a panning window and reference frame section.

Referring also to FIGS. 3-4, a video frame 50 produced by the display 20 is divided into macroblocks 52 and a configuration information section 54. The macroblocks 52 are typically sections of 16×16 pixels although the macroblocks 52 shown in FIG. 3 are larger than that for exemplary and illustrative purposes only. Dashed lines show the boundaries between the macroblocks 52, although these boundary lines would not be shown on the display 20, but are shown on FIG. 3 for illustrative purposes. The configuration information section 54 contains information regarding the image to be displayed in the frame 50, such as bit stream video resolution information. As shown in FIG. 4, a panning window 56 and a reference frame section 58 are also associated with the frame 50. If no panning window 56 is selected, either manually or automatically, to be used, then there may not be a panning window 56 associated with the frame 50.

The decoder 18 is configured to process the macroblocks 52 falling within the reference frame section 58 in order to produce a visible, displayed image portion within the panning window 56. The macroblocks 52 falling outside of the reference frame section 58 are rejected and not processed by the decoder 18. Only the portion of the image of the frame 50 that falls within the panning window 56 is sent to, and displayed by, the display 20. The macroblocks outside of the panning window 56 but within the reference frame section 58 are processed and decoded by the decoder 18 to accommodate for motion prediction within the image window 56. For example, in the frame 50 shown in FIGS. 3 and 4, the full-frame image includes icons representing a train station 60, a tree 62, a park 64, and a lake 66. The selected panning window 56, however, encompasses only the tree 62 and most of the train station 60 but does not include the park 64 or the lake 66. The entire train station image would be processed by the decoder 18, with a portion 68 being within the reference frame section 58 but not the panning window 56 and thus not displayed by the display 20. Further, a small portion 70 of the lake 66 would be processed by the decoder 18 as it is within the reference frame section 58 but no part of the lake 66 would be displayed. Thus, a reduced portion of the entire image in the frame 50 is decoded and a smaller portion of the image, i.e., the portion within the panning window 56, is displayed.

The decoder 18 is configured to provide information to the configuration block 22 regarding the incoming video signals. The decoder 18 can analyze the frames of the incoming video signal to determine, for example, where action is taking place in the video frames as opposed to portions of the video frames that are stagnant from frame to frame. The decoder 18 can provide indications of locations of the action to the configuration module 22. The decoder 18 is further configured to provide video configuration information to the configuration module 22. For example, the decoder 18 can provide indications of original resolution of video coming in to the interface device 12, a bit stream input rate, and indications of flags regarding the incoming video configuration. The bit stream input rate indicates how much compression has been applied to the video coming in to the interface device 12. How much compression is applied to the video is related to how much energy is used by the decoder 18 to decode the incoming video (in accordance with clock rate, etc.). The amount of energy to decode the video is related to the complexity of the video, including, e.g., amount of compression and the quality of the video. The decoder 18 can provide an indication of a flag related to the style of encoding of the incoming video, for example, H.264 encoding, CABAC (context adaptive binary arithmetic coder) encoding, etc. If the incoming video is encoded with CABAC encoding, then portions of the decoder 18 will run faster than normal to decode the incoming video. Further, the decoder 18 can provide an indication of a flag indicating whether the incoming video is in interlaced versus progressive display format, or a mixture of both.

Figure 5:
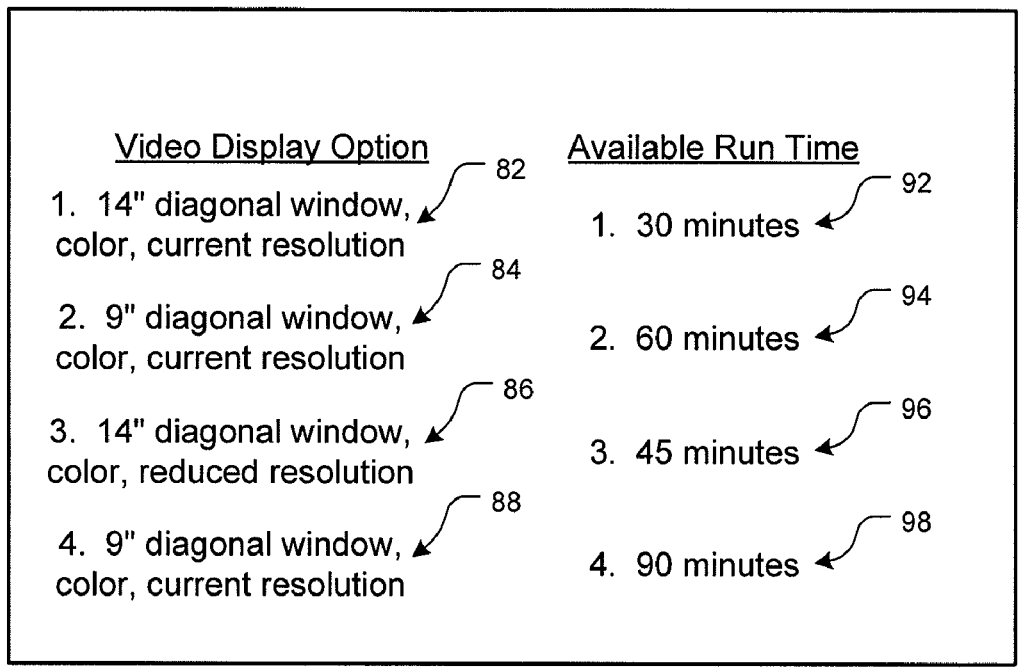
FIG. 5 is a screen shot showing video display format options and corresponding available run times.

The configuration module 22 is configured to evaluate information from the power controller 24 and the decoder 18 to provide options with power implications to the user via the user interface 26. The configuration module 22 can receive information from the power controller 24 regarding power availability. This information includes an amount of stored energy, the present clock frequency, and the present supply voltage level. The configuration module 22 can analyze this information and information from the decoder 18 and provide information to the user through the user interface 26 regarding video display format options and corresponding available run times such that the user can select a video display option and corresponding display time. Referring also to FIG. 5, for example, the configuration module 22 can provide display option indications 82, 84, 86, 88 and run time indications 92, 94, 96, 98 indicating that a window of images of a particular size can be displayed for half an hour using the current resolution and color video, or an hour using a smaller window with the current resolution, or 45 minutes with color video and a lower resolution, or an hour and a half with a smaller panning window 56, black and white video, and the lower resolution video quality. The user can interact with the user interface 26 to select one of the provided options, and the user interface 26 can relay an indication of the selection to the configuration module 22.

The configuration module 22 is configured to use the information regarding the user's video display format selection to send control signals to the power controller 24 and to the decoder 18. The configuration module 22 is configured such that the control signals sent to the power controller 24 indicate the selection by the user and can indicate to the power controller 24 what processing options to implement. For example, the power controller 24 is configured to use the control signals from the configuration module 22 to select and set the clock frequency and the supply voltage level for the device 12. The configuration module 22 is configured to send control signals to the decoder 18 indicating a location, size, and shape of the panning window 56.

The configuration module 22 can provide indications of the location, size, and shape of the window 56 to the decoder 18 as selected by the user and indicated by the user interface 26, or as determined by the configuration module 22 automatically. For example, the configuration module 22 can analyze video in the video frames to determine areas of action in the frame as determined by changes to macroblocks within the frame as opposed to stagnant blocks from frame to frame. The module 22 can determine to position the panning window 56 over a region were action is occurring such that a portion of the image where action is occurring is displayed by the display 20. Further, the configuration module 22 can automatically adjust the size of the panning window 56. For example, the module 22 may adjust the size of the window 56 depending on a size of a region within the video image where action is occurring. The module 22 can also provide indications of the shape of the window 56, e.g., length and width of a rectangle.

Further, the configuration module 22 can provide indications to the decoder 18 of a size, shape, and location of the panning window 56 as indicated by the user interface 26. For example, the user could select to zoom in on a particular region of an image. For example, if the user is viewing images in a picture-in-picture mode, the user may wish to focus on a particular portion of the smaller inset window image. An example of such a situation is if the inset window is displaying a sports game, the user may wish to highlight a region of the image displaying statistics regarding the game such as the score, the teams, and the time remaining in a particular portion (e.g., quarter) of the game etc.

The configuration module 22 can invoke use of the panning window 56 automatically or in response to input received from the user interface 26. The module 22 may invoke the use of the panning window 56 in response to selections by a user. For example, if the user selects to fast forward high-definition video, the configuration module 22 may determine that there is insufficient processing power available to process the full image in high-definition while fast forwarding. In response to this determination, the module 22 may automatically select a size of the panning window 56 and a location for the window 56 (e.g., centered relative to the full frame 50) such that the entire window 56 can be processed in high-definition while being fast forwarded. The module 22 can instruct the decoder 18 to decode frames of the video signal in addition to I-frames (that can be decoded and displayed without reference to other frames), e.g., to decode and forward for display the panning window image for all incoming frames. Further, the configuration module 22 can accept input from the user interface 26 selecting a particular size, shape, and location of the panning window 56, or may accept an indication to invoke the panning window 56 and automatically determine the size, shape, and location of the window 56. The panning window 56 can be invoked in response to a picture-in-picture mode be actuated, e.g., being automatically invoked or invoked in response to selection of high-definition resolution for the picture-in-picture window. The window 56 may also be invoked in response to other triggers such as a full-screen preview timer expiring, a power-save mode being selected, or other triggers.

The panning window 56 may be adjusted dynamically by the configuration module 22. The module 22 can dynamically, either automatically as determined by the module 22 or in response to user input from the user interface 26, adjust the position and/or size and/or shape of the panning window 56 over time. For example, if the user selects to have a desired run time, the module 22 may adjust the size of the window 56 to adapt to changes in an estimated remaining available run time.

The power controller 24 and the decoder 18 can respond to the control signals from the configuration module 22 to adjust operational characteristics of the device 12 and decode the incoming video signals appropriately. The power controller 24 is configured to adjust the clock frequency that is used to regulate the speed of the decoding performed by the decoder 18 as well as other functions on the interface device 12, and the supply voltage level powering the decoder 18. The power controller 24 is configured to set the clock frequency and the supply voltage in accordance with control signals from the configuration module 22 corresponding to the desired/selected mode of operation of the device 12. Further, the decoder 18 is configured to respond to control signals from the configuration module 22 to decode the incoming signals.

The decoder 18 decodes in accordance with a mode of decoding selected and indicated by the configuration module 22 (e.g., the quality of resolution, the type of decoding to perform, etc.). Further, the decoder 18 decodes the incoming video signals in accordance with indications of the panning window 56 provided by the configuration module 22. The decoder 18 is configured to decode only the macroblocks 52 indicated as being within the panning window 56 and further macroblocks 52 contained within the referenced frame section 58 for appropriate decoding of the image within the panning window 56. Preferably, the largest available panning window 56 has a size (and/or other characteristics) such that the reference frame section 58 does not include all of the macroblocks 52 of the frame 50 such that some macroblocks 52 are not decoded. The decoder 18 is configured to determine the size, shape, and location of the reference frame section 58 in accordance with the size, shape, and location of the panning window 56. The decoder 18 further decodes the incoming video signals in accordance with a mode indicated by the configuration module 22, e.g., color versus black and white, etc. The decoder 18 is configured to provide indications that the macroblocks 52 not within the panning window 56 should be a default color such as black. Further, the decoder 18 can scale the panning window 56 to fill the entire frame size, or may not scale the image at all especially, for example, if the selected frame 50 is to be displayed as a picture-in-picture inset window.

Figure 6:
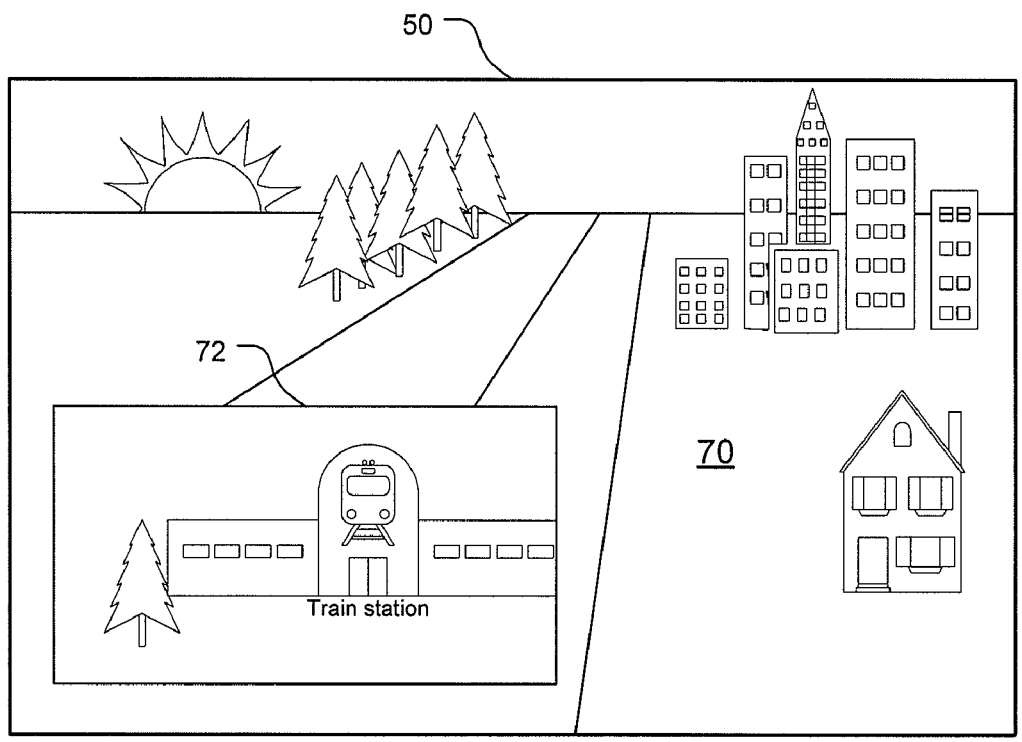
FIG. 6 is a screen shot showing picture-in-picture images.

Referring also to FIG. 6, the selected portion of the image corresponding to the panning window 56 can be displayed as a picture-in-picture inset window 72 in a larger image 70. The panning window 56 can provide the picture-in-picture window in high-definition resolution (e.g., similar to the larger image 70) because the entire image 50 is not being decoded and scaled to the picture-in-picture window 72. Thus, with the panning window 56 being either smaller than the picture-in-picture window 72 or equal to the picture-in-picture window 72 (i.e., if the panning window 56 is provided as the picture-in-picture window 72), the picture-in-picture window image can be provided in high-definition.

The configuration module 22 is configured to adapt to motion in the image and to control movement of the panning window 56. If macroblock-level motion is greater than the size of the reference frame section 58, then an error recovery algorithm within the configuration module 22 can be employed to compensate for this to reduce artifacts on the edges of the output video corresponding to the panning window 56. Also, the module 22 can dynamically and automatically adjust the size of the reference frame section 58 in response to determining that macroblock-level motion is greater than the size of the reference frame section 58. Further, the module 22 can limit the speed at which the panning window 56 is allowed to move relative to the frame 50, e.g., in accordance with a number of reference frames used by the incoming video bit stream. The lower the number of reference frames used by the incoming bit stream, the faster the configuration module 22 can move or allow the panning window 56 to be moved.

Figure 7:
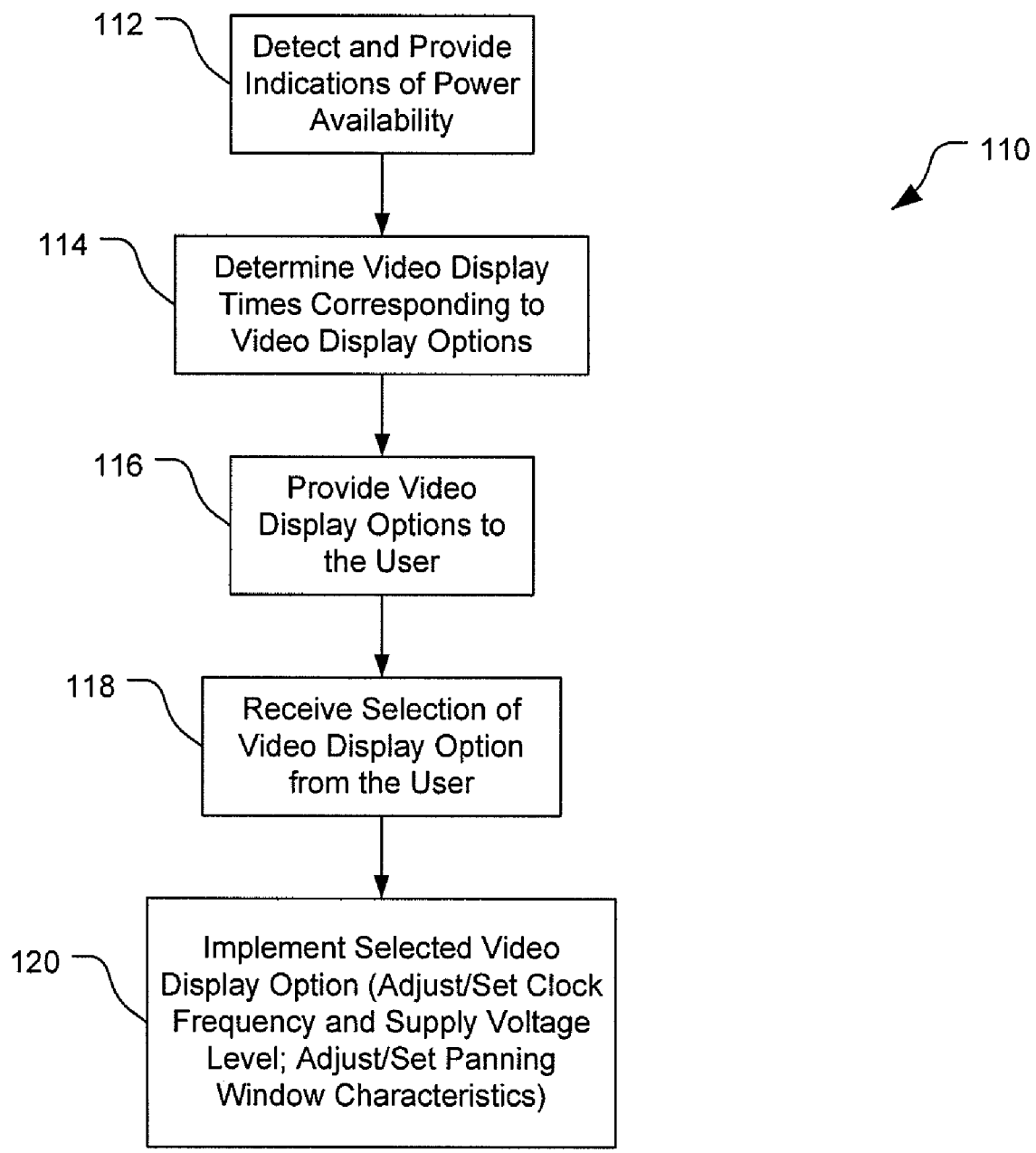
FIGS. 7-8 are block flow diagrams of processes of processing and displaying panning windows.

In operation, referring to FIG. 7, with further reference to FIGS. 2-5, a process 110 for providing the panning window 56 and viewing of an image during a power save mode using the system 10 includes the stages shown. The process 110, however, is exemplary only and not limiting. The process 110 may be altered, e.g., by having stages added, removed, or rearranged.

At stage 112, the power controller 24 detects power availability and provides indications of the power availability. The power controller 24 monitors available power, e.g., from a battery of the video interface device 12. The power controller 24 provides indications of the remaining power to the configuration module 22. The configuration module 22 determines the current power usage rate for decoding and displaying the incoming video signals. The configuration module 22 calculates a time-of-life figure of the amount of time available for decoding and displaying the incoming video signals given the amount of power remaining and the current power usage rate.

At stage 114, the configuration module 22 determines video display times corresponding to various video display options. In addition to the time-of-life calculation made at stage 112, the configuration module 22 further calculates other times for decoding and displaying video of the incoming video signals in accordance with other display options. For example, the configuration module 22 determines remaining display time for various sizes and/or shapes of the panning window 56, different resolutions for the displayed video, different display formats (e.g., color versus black and white) and combinations of these.

At stage 116, the video display options and corresponding remaining video display times are provided to the user. The display options and corresponding times may be displayed, e.g., in response to a user request, or automatically, e.g., in response to the module 22 determining that an estimated remaining available run time is lower than a threshold (e.g., lower than the run time to complete a DVD being watched). The configuration module 22 provides the indications, e.g., the indications 82, 84, 86, 88, 92, 94, 96, 98, of the video display options and the corresponding times-of-life for these options to the user interface 26. The user interface 26 communicates with the display 20 to show the user the various video display options and the amounts of time remaining for the various options. The user can then evaluate whether there is sufficient time remaining for the desired video in a desired video format. Alternatively, the configuration module 22 can determine whether sufficient time remains for the existing video display format of a fixed-time video source such as a DVD. In this case, the module 22 preferably selects the largest panning window 56 that has a corresponding time-of-life at least as long as the remaining available run time of the video source.

At stage 118, the user's selection of a desired video display option is received. The user interacts with the user interface 26 to select one of the available video display options. This selection is transmitted from the user interface 26 to the configuration module 22. The configuration module 22 sends control signals to the power controller 24 and the decoder 18 to indicate the desired video display option. The power controller 24 adjusts, as appropriate, the clock frequency used by the decoder and/or the supply voltage level. The decoder 18 responds to the control signals from the configuration module 22 to adjust, as appropriate, the video decoding parameters such as resolution, and the video panning window characteristics such as size, shape, location, etc. Thus, the decoder 18 sets the panning window characteristics and/or other video processing (e.g., decoding) options in accordance with the control signals from the configuration module 22. The decoder 18 further sets/adjusts the size, shape, and location of the reference frame section 58 to accommodate the size, shape, and location of the panning window 56 and motion in the incoming video images. The decoder 18 rejects (i.e., does not decode or otherwise process) the macroblocks 52 that fall outside of the reference frame section 58, or portions of the macroblocks 52 that fall out side the reference frame section 58. The process 110 returns to stage 112 such that ongoing determinations of remaining power time can be determined and provided to the user and further adjustments can be made to the video display options to accommodate changing needs/desires of video display.

Figure 8:
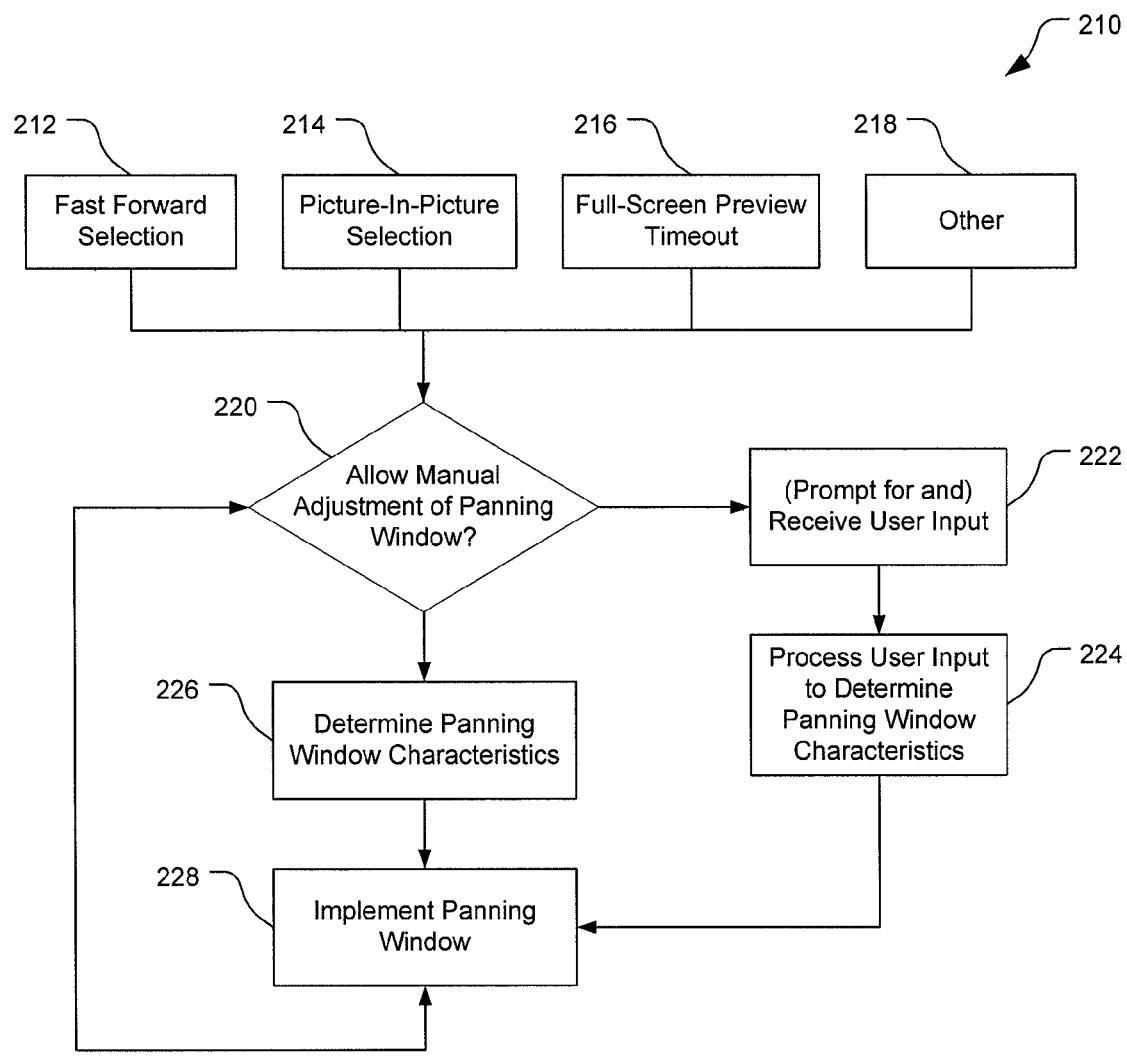

In operation, referring to FIG. 8, with further reference to FIGS. 2-5, a process 210 for using the panning window 56, here for use in fast forwarding, picture-in-picture displays, and video (e.g., movie) previews, using the system 10 includes the stages shown. The process 210, however, is exemplary only and not limiting. The process 210 may be altered, e.g., by having stages, removed, or rearranged.

At stages 212, 214, 216, 218 a triggering event occurs to initiate use of the panning window 56. At stage 212, a selection is made to fast forward the video being displayed by the display 20. For example, the user may push a fast forward button on a remote control for fast forwarding a DVD or other disc player formats such as Blu-ray or HD-DVD. At stage 214, a picture-in-picture selection is made, e.g., by a user selecting a picture-in-picture function on a remote control. At stage 216, a full-screen preview option times out. For example, a user viewing a preview of a pay-per-view movie may reach the limit of the free, full-screen preview time for the movie, and therefore a reduced-screen option is initiated. At stage 218, some action other than those for stages 212, 214, 216 is initiated to trigger the use of the panning window 56. For example, another action triggering the panning window 56 could be that a battery energy level drops below a threshold and the configuration module automatically decides to change to a reduced-screen format.

At stage 220, an inquiry is made as to whether manual adjustment of the panning window 56 is allowed. Stage 220 may be illustrative only because if manual adjustment is allowed, then the process 210 would proceed to stage 222 and if it is not allowed, then the process 210 would proceed to stage 226. Thus, while an inquiry may not actually be made as to whether the manual adjustment of the panning window 56 is permitted, stage 220 is shown to represent that there are two possible options, at least, in the flow of the process 210. If manual adjustment of the panning window 56 is allowed, the process 210 proceeds to stage 222 and otherwise proceeds to stage 226.

At stage 222, user input regarding the panning window 56 is received. Preferably, the configuration module 22 interacts with the user interface 26 to cause the display 20 to prompt the user for input regarding the panning window characteristics such as size, shape, and location. The user interacts with the user interface 26 to provide information regarding desired characteristics of the panning window 56, which are transmitted to the configuration module 22.

At stage 224, the configuration module 22 processes the user input to determine the panning window characteristics. The processor 22 evaluates the user input to translate the input into the panning window characteristics. The user input may be direct indications of the characteristics such as direct indications of the size, location, shape, resolution, color vs. black and white, etc. of the panning window 56 (e.g., to zoom in on a portion of a full-frame image) such as a selected window size, shape, and location indicated by using a mouse (e.g., to mark opposite corners of a rectangular window) or selection of one of the indications 82, 84, 86, 88, 92, 94, 96, 98 shown in FIG. 5. Alternatively, the user input may be an indirect indication of window characteristics such as an indication of a desired amount of time for video display, which the configuration module 22 then uses to calculate appropriate panning window characteristics to satisfy the desired run time given the power availability indicated by the power controller 24. The configuration module 22 provides control signals to the decoder 18 to implement the panning window 56 at stage 228.

At stage 226, the configuration module 22 automatically determines the panning window characteristics. The configuration module 22 may determine the characteristics by accessing default parameters, by evaluating motion within the image of the video and configuring the window 56 to show changing image portions, by analyzing an amount of run time available and comparing this with a remaining run time of a video source such as a DVD and configuring the window 56 such that an estimated run time is within an estimated available run time, or combinations of these as well as other techniques. The configuration module 22 provides control signals to the decoder 18 to implement the characteristics of the panning window 56 at stage 228.

At stage 228, the decoder 18 implements the panning window 56 in accordance with the control signals received from the configuration module 22. The decoder 18 uses the control signals from the configuration module 22 to set the shape, size, location, etc. of the panning window 56. The decoder 18 further evaluates the images within the video to determine the size, shape, and location of the reference frame section 58 in accordance with the video (e.g., motion in the video images) and the characteristics of the panning window 56. The process 210 returns to stage 220 for repeated automatic or manual determination of the panning window characteristics.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while the panning window 56 has been shown as a rectangle of contiguous, adjacent macroblocks, other shapes of contiguous macroblocks, such as ovals or joined circles, could be used for a panning window. Further, non-contiguous, non-adjacent macroblocks could be used and considered a single panning window (despite physically separate portions of the image being shown). In this case, macroblocks surrounding each portion of the visible panning window are preferably sill decoded to help remove blocking effects.

A "signal" or "stream" may be modified by a component and referred to herein (in the description and/or claims) as "the signal" or "the stream" both before and after the modification. For example, a "stream" or "signal" that is provided by the interface 14 to the display 20 can be modified by intervening components (e.g., the decoder 18) and still be referred to as "the stream" or "the signal" before and after the interface 14, the intervening components, and the display 20.

Further, while the description above refers to "the invention," more than one invention may be disclosed.

What is claimed is:

1. A video processing apparatus for use in a video receiver, the video processing apparatus comprising:
   a decoder configured to decode encoded video information into decoded video information and to output the decoded information; and
   a configuration module coupled to the decoder and configured to provide a control signal to the decoder indicative of a reduced-image portion of a video frame to be displayed, wherein the reduced-image portion is determined based upon a display capability including a display-window size and display resolution;
   wherein the decoder is configured to respond to the control signal by decoding first macroblocks of the video information within the reduced-image portion and second macroblocks of the video information, in a reference section, the reference section adjacent the first macroblocks within the reduced-image portion and the reference section forming a portion smaller than the video frame, the decoding of the second macroblocks to account for motion of the images in the reduced-image portion without decoding third macroblocks in the video frame lying outside of the reduced-image portion and the reference section.

2. The apparatus of claim 1 wherein the configuration module is configured to indicate a size of the reduced-image portion.

3. The apparatus of claim 2 wherein the configuration module is configured to indicate a location of the reduced-image portion.

4. The apparatus of claim 2 wherein the decoder is configured to alter a location of the reduced-image portion dynamically.

5. The apparatus of claim 4 wherein the decoder is configured to alter the location of the reduced-image portion to encompass an area of the image experiencing change from frame to frame.

6. The apparatus of claim 1 further comprising a power controller configured to determine power availability for the decoder and configured to set a clock frequency used by the decoder and a supply voltage used by the decoder, wherein the configuration module is coupled to the power controller and configured to determine a first remaining time available for decoding the video information in a first, present manner given the power availability.

7. The apparatus of claim 6 wherein the configuration module is further configured to determine a second remaining time available for decoding the video information in a second manner, different than the first manner, given the power availability.

8. The apparatus of claim 7 wherein the reduced-image portion is a first reduced-image portion with a first area and the second manner includes decoding using a second reduced-image portion with a second area different than the first area.

9. A video processing and display system comprising:
   a display configured to provide visual images corresponding to video signals processed by the system; and
   a video processing module coupled to the display and configured to receive and process video signals containing encoded video information indicative of frames of video images, the encoded video information corresponding to groups of image pixels, the video processing module being configured to selectively decode only a portion of the encoded information for a particular video frame, the portion being less than all of the encoded information for all the pixels of the particular video frame, the portion corresponding to a first subset of the groups of pixels for the particular frame corresponding to a reduced-size image of the particular video frame, the first subset containing less than all of the groups of pixels, and a second subset of the groups of pixels in a reference section corresponding to a motion of the images in the reduced-size image of the particular video frame, the second subset lying adjacent to the first subset and the second subset containing less than all the groups of pixels within the particular video frame, wherein pixels within the particular video frame lying outside of the reduced-size image and the reference section are not decoded, the video processing module further configured to determine a display capability based upon a criteria and to provide decoded signals to the display to display the reduced-size image for the particular frame at a determined resolution, the reduced-size image being smaller than the frame and corresponding to the decoded portion of the encoded information for the particular frame, and wherein the reduced-size image and determined resolution for the particular frame is selected in accordance with the determined display capability.

10. The system of claim 9 wherein the reduced-size image has a rectangular shape.

11. The system of claim 9 wherein the second subset of groups of pixels comprises less than all the groups of pixels in the first subset.

12. The system of claim 9 wherein the video processing module is configured to decode only the portion of the encoded information in response to at least one of: a selection of a fast-forwarding feature, a selection of a picture-in-picture feature, a selection of a power-save feature, and a timeout of a preview feature.

13. The system of claim 9 wherein the video processing module is configured to automatically and dynamically change which groups of pixels to decode as the portion of the encoded information independent of input from a source external to the system.

14. The system of claim 9 wherein the video processing module is configured to determine indications of time remaining for processing the encoded video information at a first, current power consumption pace and at a second, alternate power consumption pace, the first and second power consumption paces corresponding to different image display sizes, at least one of the first and second power consumption paces corresponding to the video processing module decoding only the portion of the encoded video information.

15. A video processing apparatus for use in a video receiver, the video processing apparatus comprising:
an input configured to receive encoded video signals indicative of pixel values for pixels in video frames; and
a video processing module configured to decode the encoded video signals to provide decoded video signals indicative of the pixel values for full video frames in a first mode at a first rate and in a first resolution, and to operate in a second mode to decode a first and second subset of the pixel values for each video frame to provide decoded video signals indicative of the pixel values for partial video frames, wherein the second mode is determined in accordance with a determination of a display capability of a display for a display-window size and display resolution, and wherein the first subset of the pixel values corresponds to a reduced-size image of the full video frame, the first subset containing less than all of the groups of pixels of the full video frame, and the second subset of the pixel values are decoded in a reference section corresponding to a motion of the images in the reduced-size image of the full video frame, the second subset lying adjacent to the first subset and the second subset containing less than all the groups of pixels within the full video frame, wherein pixels within the full video frame lying outside of the reduced-size image and the reference section are not decoded.

16. The apparatus of claim 15 wherein the frames have a frame size, and wherein the video processing module is configured, in the second mode, to:
output decoded video information for use by the display to display a display-window image having a display-window size that is smaller than the decode-window size.

17. The apparatus of claim 16 wherein the output decoded video information is configured to cause the display-window image to be in the first resolution.

18. The apparatus of claim 16 wherein the output decoded video information is configured to cause the display-window image to be a picture-in-picture image free of scaling.

19. The apparatus of claim 16 wherein the video processing module is configured to output the decoded video information in the second mode at a second rate, the second rate being faster than the first rate.

20. The apparatus of claim 16 wherein the video processing module is configured to enter the second mode in response to at least one of: an initiation of fast-forwarding of the video frames, an initiation of picture-in-picture mode, an initiation of a power-save mode, and a timeout of a video-preview mode.

21. The apparatus of claim 16 wherein the video processing module is configured to alter a location of the reference portion based on changes in pixel values in a series of the frames.

22. The apparatus of claim 16 wherein the video processing module is configured to estimate a first time remaining for operation in the first mode and to estimate a second time remaining for operation in the second mode and to output indications of the first and second times remaining and an indication of the display-window size in association with the second time remaining.

23. The apparatus of claim 16 wherein the video processing module is configured to receive user input to zoom in on a zoom portion of the frame that is smaller than the display-window size and to scale the zoom portion to the display-window size.

24. A user-interface method comprising:
presenting video display options to a user, the video display options based upon a determination of a display capability regarding display size and resolution;
receiving user selection of a desired video display option from the presented options; and
setting video decoding parameters, in accordance with the user selection, indicative of a reduced-image portion of a full video frame to be displayed, and wherein first macroblocks of video information within the reduced image portion are decoded, second macroblocks adjacent the first macroblocks within the reduced-image portion are decoded in a reference section, the reference section forming a portion smaller than the full video frame, the decoding of the second macroblocks to account for motion of the images in the reduced-image portion, and wherein third macroblocks within the full video frame lying outside the reduced-image portion and reference section are not decoded.

* * * * *